US012608840B2

(12) United States Patent
    Prakash et al.

(10) Patent No.: US 12,608,840 B2
(45) Date of Patent: Apr. 21, 2026

(54) ORIENTATION BASED ON VANISHING POINTS

(71) Applicant: Apple Inc., Cupertino, CA (US)

(72) Inventors: Jai Prakash, Santa Clara, CA (US); Lina M. Paz-Perez, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 77 days.

(21) Appl. No.: 18/666,992

(22) Filed: May 17, 2024

(65) Prior Publication Data

US 2024/0386599 A1      Nov. 21, 2024

Related U.S. Application Data

(60) Provisional application No. 63/467,395, filed on May 18, 2023.

(51) Int. Cl.
    *G06T 7/73*      (2017.01)
    *G01C 21/16*      (2006.01)
    *G06T 7/13*      (2017.01)
    *G06T 13/00*      (2011.01)
(52) U.S. Cl.
    CPC ................ *G06T 7/73* (2017.01); *G01C 21/16* (2013.01); *G06T 7/13* (2017.01); *G06T 13/00* (2013.01)

(58) Field of Classification Search
    CPC .... G06T 7/73; G06T 7/70; G06T 7/13; G06T 13/00; G06T 19/006; G06T 2207/10012; G06F 3/011; G06C 21/16; H04N 13/332; G01C 21/16
    See application file for complete search history.

(56) References Cited

U.S. PATENT DOCUMENTS

| | | | |
|---|---|---|---|
| 2014/0198227 A1* | 7/2014 | Mohammad Mirzaei | ................... G06V 10/242 348/208.2 |
| 2017/0094158 A1* | 3/2017 | Van Olst | .............. H04N 23/633 |
| 2017/0372481 A1* | 12/2017 | Onuki | ........................ G06T 7/13 |
| 2020/0184656 A1* | 6/2020 | Murphy-Chutorian | ..................... G06T 7/246 |
| 2021/0256720 A1* | 8/2021 | Choi | ........................ G06T 7/536 |

* cited by examiner

*Primary Examiner* — Michelle Chin
(74) *Attorney, Agent, or Firm* — Fernando & Partners, LLP

(57)      ABSTRACT

In one implementation, a method of determining a downward direction is performed by a device including one or more processors, non-transitory memory, and an image sensor. The method includes capturing, using the image sensor, an image of a physical environment. The method includes detecting a plurality of lines within the image of the physical environment. The method includes determining one or more vanishing directions based on the plurality of lines. The method includes defining a downward direction based on the one or more vanishing directions.

19 Claims, 7 Drawing Sheets

600

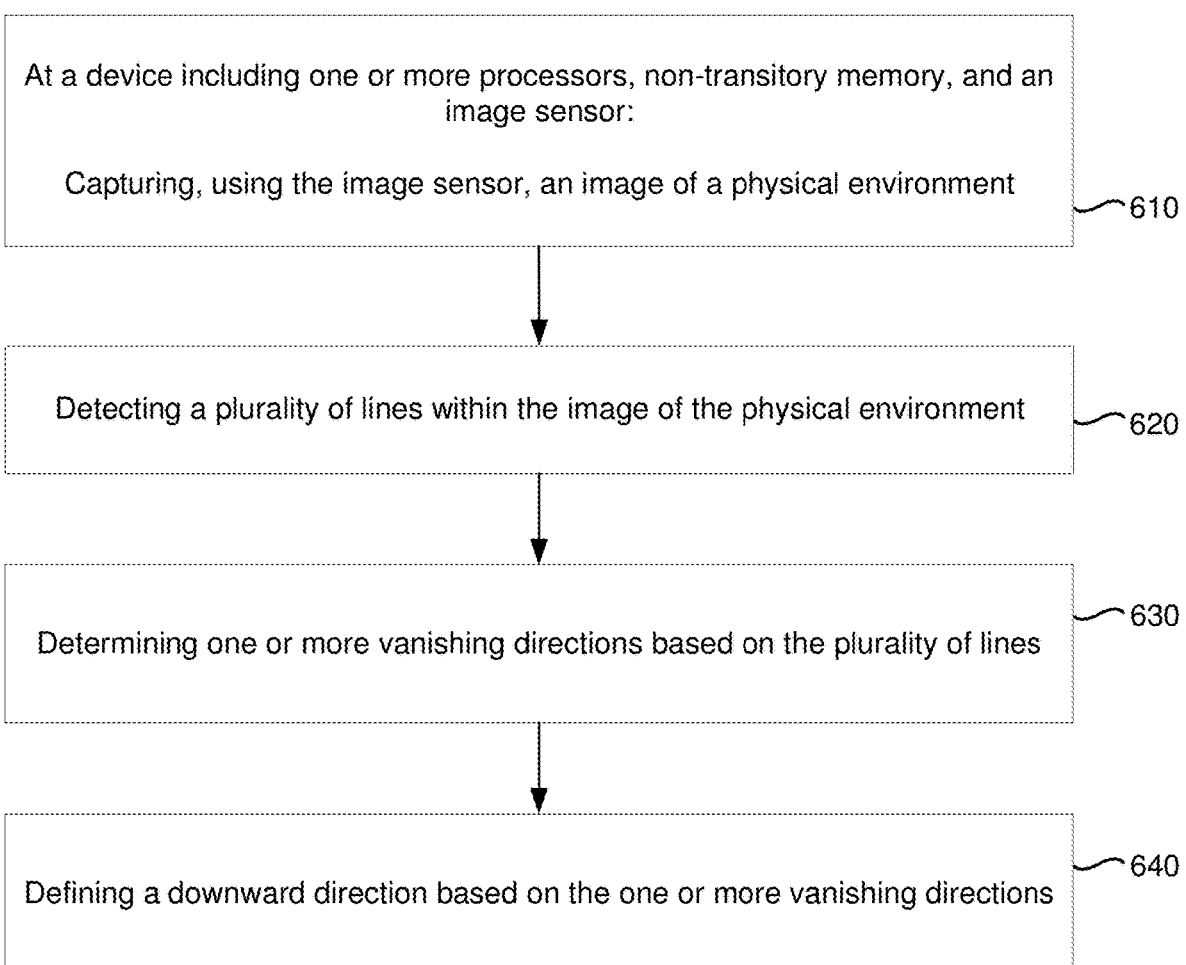

At a device including one or more processors, non-transitory memory, and an image sensor:

Capturing, using the image sensor, an image of a physical environment                     ⌐610

Detecting a plurality of lines within the image of the physical environment          ⌐620

Determining one or more vanishing directions based on the plurality of lines          ⌐630

Defining a downward direction based on the one or more vanishing directions          ⌐640

Figure 6

ORIENTATION BASED ON VANISHING POINTS

TECHNICAL FIELD

This application claims priority to U.S. Provisional Patent App. No. 63/467,395, filed on May 18, 2023, which is hereby incorporated by reference in its entirety.

TECHNICAL FIELD

The present disclosure generally relates to systems, methods, and devices for defining a coordinate system.

BACKGROUND

In various implementations, an extended reality (XR) environment is presented by a head-mounted device (HMD). Various HMDs include a scene camera that captures an image of the physical environment in which the user is present (e.g., a scene) and a display that overlays virtual content on the physical environment. In various implementations, the virtual content is displayed according to a coordinate system, e.g., a virtual balloon floats upward or a virtual ball falls downward. In various implementations, determining the coordinate system (e.g., which direction on the display corresponds to "up" or "down") is based on a gravity vector measured by an inertial measurement unit. However, in various circumstances, such a coordinate system may be unstable or skewed with respect to user's perception.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is a flowchart of a method of determining a downward direction based on one or more vanishing points.

Figure 1A:
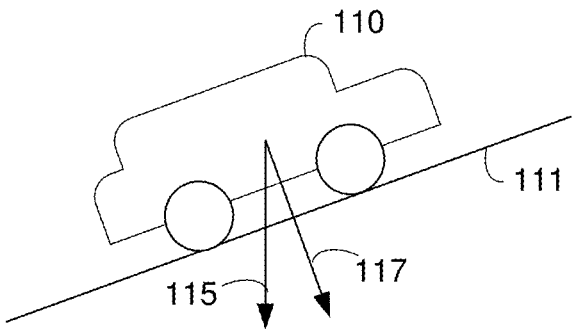
FIG. 1A illustrates a car on an incline.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for determining a downward direction. In various implementations, the method is performed by a device including one or more processors, non-transitory memory, and an image sensor. The method includes capturing, using the image sensor, an image of a physical environment. The method includes detecting a plurality of lines within the image of the physical environment. The method includes determining one or more vanishing directions based on the plurality of lines. The method includes defining a downward direction based on the one or more vanishing directions.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As described above, in various implementations, virtual content is displayed over a physical environment (either directly using a transparent see-through display or over an image of the physical environment using an opaque pass-through display). In various implementations, a coordinate system of the physical environment is defined including, at least, a definition of a downward direction. In various implementations, virtual content is displayed according to the coordinate system. For example, in various implementations, a virtual application window is displayed with an edge perpendicular to the downward direction. In various implementations, a virtual ball is displayed as falling in the downward direction. In various implementations, a virtual balloon is displayed as floating upward, opposite the downward direction.

In various implementations, determining the downward direction is based on a vector measured by an inertial measurement unit (IMU). At rest, the vector generally coincides with the direction of gravity, e.g., downward. However, in various circumstances, the vector may be unstable or skewed with respect to user's perception. For example, upon an incline, the vector points in the direction of gravity rather than pointing to the ground. As another example, in a moving vehicle, as the vehicle speeds up or slows down, the vector is affected by the acceleration, changing and not consistently pointing in the direction of gravity or the floor of the vehicle.

Accordingly, in various implementations, the coordinate system is determined based on vanishing points of an image of the physical environment. Such a coordinate system may more closely match a user's perception (e.g., that "down" points to the ground or floor) and may be more stable, particularly in moving environments.

FIG. 1A illustrates a car 110 on an incline 111. An IMU within the car 110 measures a first vector 115 in the direction of gravity. However, using vanishing points of an image from within the car 110, a second vector 117 is determined which points towards the floor of the car 110 and is perpendicular to the incline 111.

Figure 1B:
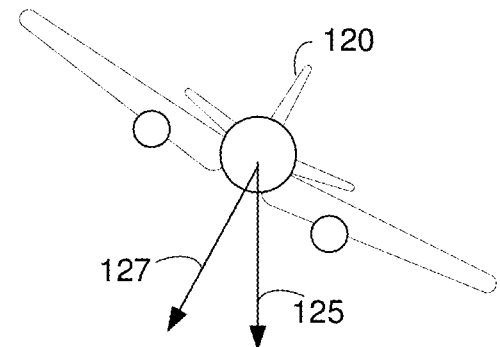
FIG. 1B illustrates an airplane performing a banking maneuver.

FIG. 1B illustrates an airplane 120 performing a banking maneuver. An IMU within the airplane 120 measures a first vector 125 in the direction of gravity. However, using vanishing points of an image from within the airplane 120, a second vector 127 is determined which points towards the floor of the airplane 120.

Figure 1C:
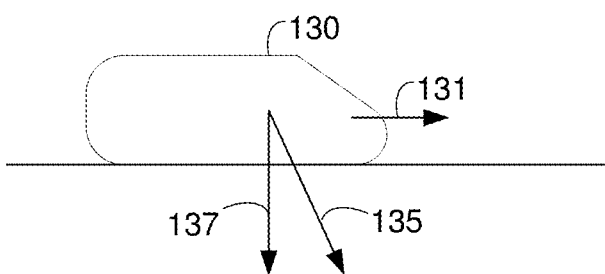
FIG. 1C illustrates a train accelerating according to an acceleration vector.

FIG. 1C illustrates a train 130 accelerating according to an acceleration vector 131. An IMU within the train 130 measures a first vector 135 which does not point in the direction of gravity, but rather is affected by both gravity and the acceleration of the train 130. However, using vanishing points of an image from within the train 130, a second vector 137 is determined which points towards the floor of the train 130 and is in the direction of gravity.

Figure 2:
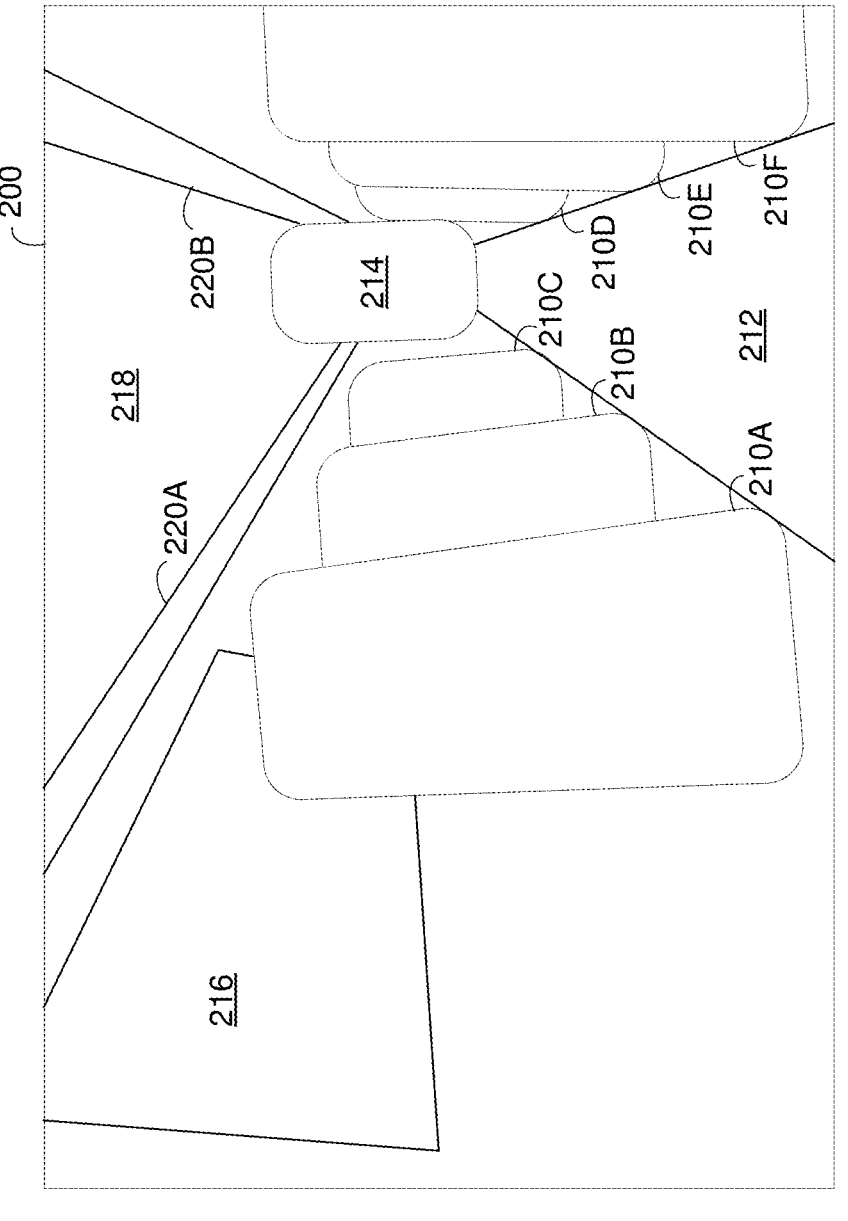
FIG. 2 illustrates an image of a physical environment.

FIG. 2 illustrates an image of a physical environment 200. In various implementations, the physical environment is a moving vehicle. In various implementations, the physical environment is the interior of subway car. The physical environment includes a plurality of seats 210A-210F, an aisle 212 separating sets of the plurality of seats 210A-210F, a door 214 at the end of the aisle 214, a window 216, and a ceiling 218 with lights 220A-220B on either side.

Figure 3:
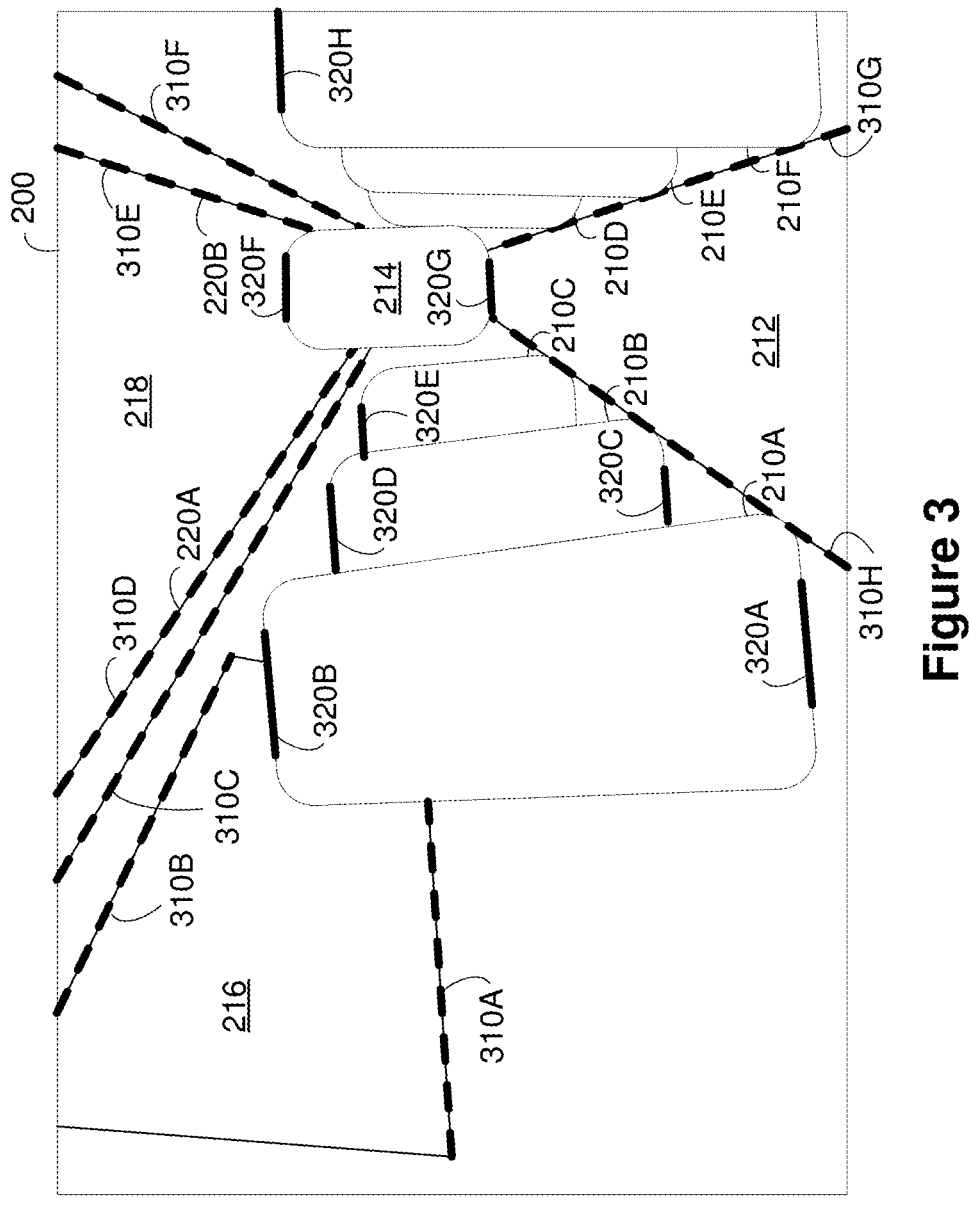
FIG. 3 illustrates a plurality of lines detected in the image of the physical environment.

FIG. 3 illustrates the image of the environment 200 overlaid with a plurality of lines 310A-310H, 320A-320H detected in the image of the environment 200.

Figure 4:
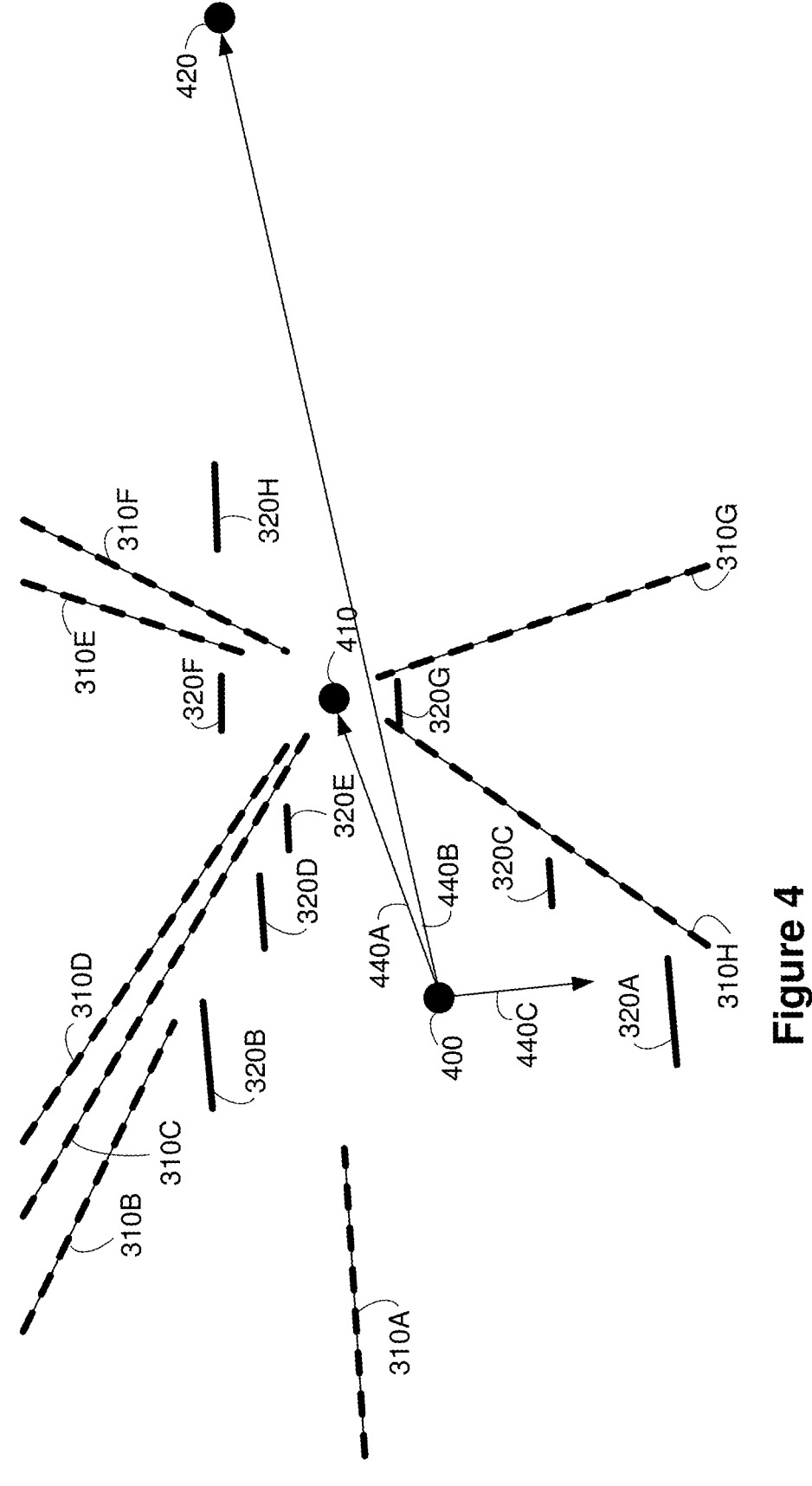
FIG. 4 illustrates vanishing points based on the plurality of lines.

FIG. 4 illustrates the plurality of lines 310A-310H, 320A-320H with a first vanishing point 410 and a second vanishing point 420 determined based on the plurality of lines 310A-310H, 320A-320H.

In various implementations, the first vanishing point 410 and the second vanishing point 420 are determined using one or more RANSAC (random sample consensus) algorithms. For example, in various implementations, the first vanishing point 410 is determined by a 2-line RANSAC algorithm in which, for n iterations, two of the plurality of lines 310A-310H, 320A-320H are selected and an intersection point is determined. Each of the two of the plurality of lines 310A-310H, 320A-320H may be selected from either a first set of the plurality of lines 310A-310H or a second set of the plurality of lines 320A-320H. Thus, n intersection points are determined as candidate vanishing points. Each candidate vanishing point has a number of the plurality of lines as an inlier set, where each line of the inlier set (when extended in both directions) passes within some threshold distance of the candidate vanishing point. The candidate vanishing point with the largest inlier set is selected as the preliminary first vanishing point. The preliminary first vanishing point is then refined based on the corresponding inlier set. For example, in various implementations, the first vanishing point 410 is the point closest to each of the lines (when extended in both directions) of the inlier set of the preliminary first vanishing point using a minimum mean square error measurement. Thus, referring to FIG. 4, the inlier set includes a first set of the plurality of lines 310A-310H which are used to determine the first vanishing point 410.

The first vanishing point 410 defines a first vector 440A between the principle point 400 of the perspective of the image of the physical environment 200 and the first vanishing point 410. Further, this first vector defines a first direction.

In various implementations, the second vanishing point 420 is also determined using a 2-line RANSAC algorithm upon the plurality of lines 320A-320H excluding the first set of the plurality of lines 310A-310H. The second vanishing point 420 defines a second vector 440B between the principle point 400 of the perspective of the image of the physical environment 200 and the second vanishing point 420. Further, this second vector defines a second direction.

In various implementations, the second direction is determined by a voting algorithm. For example, in various implementations, the image of the physical environment 200 is transformed such that the first vanishing point 410 aligns with the principal point of the perspective of the image of the physical environment 200. A voting is applied to each line direction between 0 and $\pi$ and a mean shift is used to find the second direction (and a corresponding second vector). In various implementations, a third vector 440C, defining a third direction, is determined as proportional to a cross-product of the first vector 440A and the second vector 440B.

In various implementations, the first vanishing point 410 and the second vanishing point 420 are determined using a 3-line RANSAC algorithm in which, for n iterations, three of the plurality of lines 310A-310H, 320A-320H are selected. Each of the three of the plurality of lines 310A-310H, 320A-320H may be selected from either the first set of the plurality of lines 310A-310H or the second set of the plurality of lines 320A-320H. A candidate first vanishing point is determined as the intersection of a first line and a second line of the three lines. The candidate first vanishing point defines a first candidate direction. Further, a third line of the three lines defines a candidate second direction perpendicular to the candidate first direction. Further, a candidate third vanishing direction is determined using a cross-product of vectors along the candidate first direction and the candidate second direction. Thus, n candidate coordinate systems are generated, each defined by a corresponding candidate first direction, candidate second direction, and candidate third direction. Each candidate coordinate system has a number of the plurality of lines as an inlier set. The candidate coordinate system with the largest inlier set is selected as the coordinate system including a first direction, second direction, and third direction.

In various implementations, the third direction is presumed to be the downward direction. In various implementations, the downward direction is selected from the first direction, the second direction, and the third direction as that which is closest to the vector output from an IMU. Notably, the third direction is neither the direction of vector provided by the IMU nor a vertical direction in the image of the physical environment.

Figure 5:
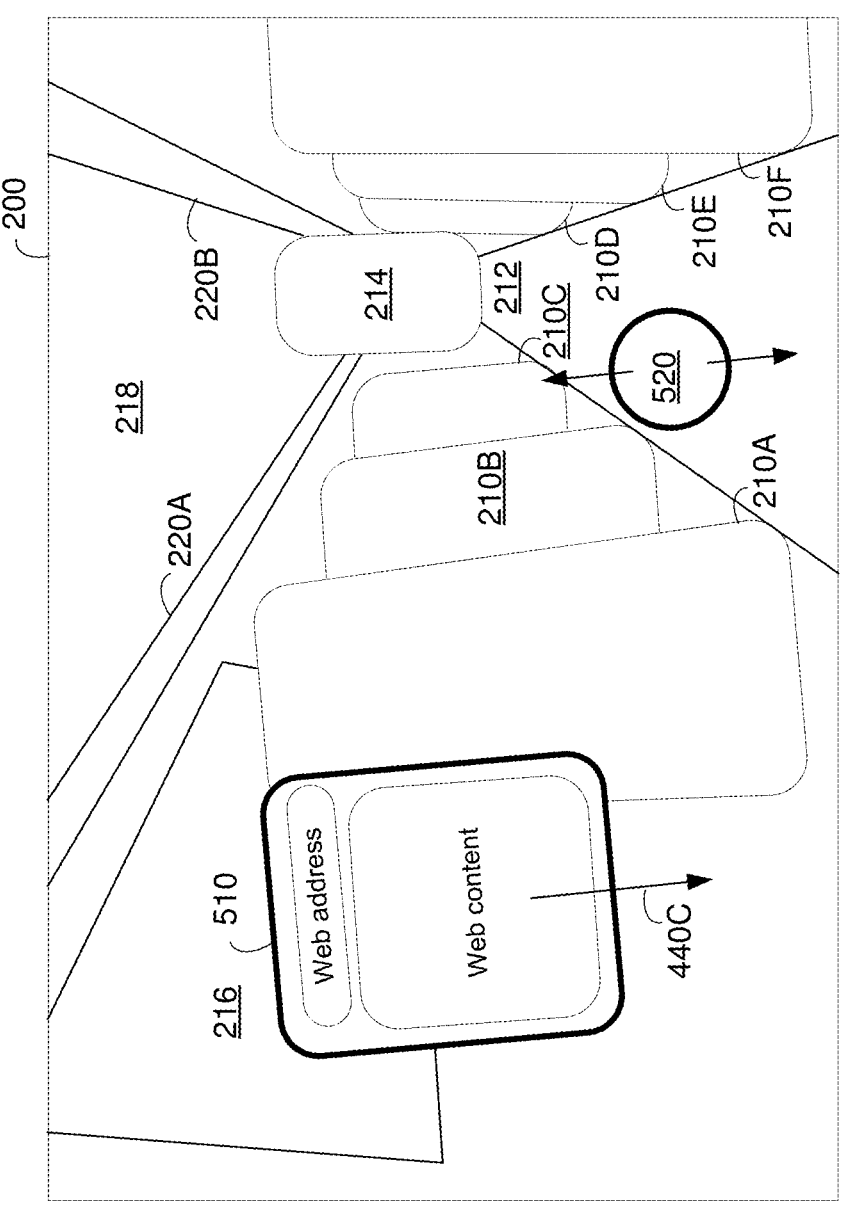
FIG. 5 illustrates virtual content displayed over the image of the physical environment.

FIG. 5 illustrates the image of the physical environment 200 with virtual content overlaid thereon. The virtual content includes a virtual web browser window 510 and a virtual ball 520. The virtual web browser window 510 is aligned with the third direction. In particular, the left edge and right edge of the virtual web browser window 510 are parallel to the third direction and the top edge and bottom edge of the virtual web browser window 510 are perpendicular to the third direction. The virtual ball 520 bounces off the aisle 212 moving up and down along the third direction.

FIG. 6 is a flowchart representation of a method of determining a downward direction in accordance with some implementations. In various implementations, the method 600 is performed by a device with one or more processors, non-transitory memory, and an image sensor. In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device capturing, using the image sensor, an image of a physical environment. In various implementations, the physical environment is a moving vehicle. For example, in various implementations, the physical environment is a car, train, plane, or subway.

The method 600 continues, in block 620, with the device detecting a plurality of lines within the image of the physical environment. Various line detection algorithms may be used including a Hough transform or convolution-based techniques.

The method 600 continues, in block 630, with the device determining one or more vanishing directions based on the plurality of lines. In various implementations, determining the one or more vanishing directions includes determining a first vanishing point. In various implementations, determining the first vanishing point is based on a random sample consensus (RANSAC) algorithm. In various implementations, the RANSAC algorithm defines a first subset of the plurality of lines. In various implementations, determining the one or more vanishing directions includes determining a second vanishing direction. In various implementations, determining the second vanishing direction includes determining a second vanishing point based on the plurality of lines excluding the first subset of the plurality of lines. In various implementations, determining the second vanishing point is based on a RANSAC algorithm. In various implementations, determining the second direction is based on a voting algorithm. In various implementations, determining the one or more vanishing directions includes determining a third vanishing direction based on the plurality of lines. In various implementations, determining the third vanishing direction is based on a cross-product of the first direction and the second direction. In various implementations, determining the one or more vanishing directions includes determining a first vanishing direction, a second vanishing direction, and a third vanishing direction based on a 3-line RANSAC algorithm.

The method 600 continues, in block 640, with the device defining a downward direction based on the one or more vanishing directions. In various implementations, the method 600 includes selecting the third direction as the downward direction. In various implementations, the method 600 includes selecting the first direction, the second direction, or the third direction as the downward direction based on a vector from an inertial measurement unit.

In various implementations, the method 600 includes displaying virtual content based on the downward direction. In various implementations, displaying the virtual content based on the downward direction includes displaying a virtual object aligned with the downward direction. For example, in FIG. 5, the virtual web browser window 510 is aligned with the downward direction. In various implementations, displaying the virtual content based on the downward direction includes displaying a virtual object moving along the downward direction. For example, in FIG. 5, the virtual ball 520 bounced up and down along the downward direction.

In various implementations, determining the downward direction based on a detected vanishing direction is more robust, particularly in a moving physical environment. Accordingly, in various implementations, the downward direction is repeatedly determined using vanishing directions (rather than, e.g., directly from an inertial measurement unit). Thus, in various implementations, the method 600 includes capturing, using the image sensor, a second image of the physical environment, detecting a plurality of lines within the second image, determining an updated one or more vanishing directions based on the plurality of lines within the second image, and updating the downward direction based on the updated one or more vanishing directions. In various implementations, the method 600 further comprises updating the display of the virtual content based on the updated downward direction.

In some implementations, the one or more XR displays 712 are configured to provide the XR experience to the user. In some implementations, the one or more XR displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 712 correspond to diffractive, reflective, polarized, holographic, etc. waveguide displays. For example, the electronic device 700 includes a single XR display. In another example, the electronic device includes an XR display for each eye of the user. In some implementations, the one or more XR displays 712 are capable of presenting MR and VR content.

In some implementations, the one or more communication buses 704 include circuitry that interconnects and controls communications between system components. In some implementations, the one or more I/O devices and sensors 706 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 712 are configured to provide the XR experience to the user. In some implementations, the one or more XR displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 712 correspond to diffractive, reflective, polarized, holographic, etc. waveguide displays. For example, the electronic device 720 includes a single XR display. In another example, the electronic device includes an XR display for each eye of the user. In some implementations, the one or more XR displays 712 are capable of presenting MR and VR content.

In some implementations, the one or more image sensors 714 are configured to obtain image data that corresponds to at least a portion of the face of the user that includes the eyes of the user (any may be referred to as an eye-tracking camera). In some implementations, the one or more image sensors 714 are configured to be forward-facing so as to obtain image data that corresponds to the physical environment as would be viewed by the user if the electronic device 700 was not present (and may be referred to as a scene camera). The one or more optional image sensors 714 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730 and an XR presentation module 740.

The operating system 730 includes procedures for handling various basic system services and for performing hardware dependent tasks. In some implementations, the XR presentation module 740 is configured to present XR content to the user via the one or more XR displays 712. To that end, in various implementations, the XR presentation module 740 includes a data obtaining unit 742, an orientation unit 744, an XR presenting unit 746, and a data transmitting unit 748.

In some implementations, the data obtaining unit 742 is configured to obtain data (e.g., presentation data, interaction data, sensor data, location data, etc.) from other components of the electronic device 700 and/or other electronic devices. To that end, in various implementations, the data obtaining unit 742 includes instructions and/or logic therefor, and heuristics and metadata therefor.

In some implementations, the orientation unit 744 is configured to determine a downward direction based on one or more vanishing directions of an image. To that end, in various implementations, the orientation unit 744 includes instructions and/or logic therefor, and heuristics and metadata therefor.

In some implementations, the XR presenting unit 746 is configured to display virtual content based on the downward direction via the one or more XR displays 712. To that end, in various implementations, the XR presenting unit 746 includes instructions and/or logic therefor, and heuristics and metadata therefor.

In some implementations, the data transmitting unit 748 is configured to transmit data (e.g., presentation data, location data, etc.) to other components of the electronic device 700 and/or other electronic devices. To that end, in various implementations, the data transmitting unit 748 includes instructions and/or logic therefor, and heuristics and metadata therefor.

Although the data obtaining unit 742, the orientation unit 744, the XR presenting unit 746, and the data transmitting unit 748 are shown as residing on a single device (e.g., the electronic device 700), it should be understood that in other implementations, any combination of the data obtaining unit 742, the orientation unit 744, the XR presenting unit 746, and the data transmitting unit 748 may be located in separate computing devices.

Figure 7:
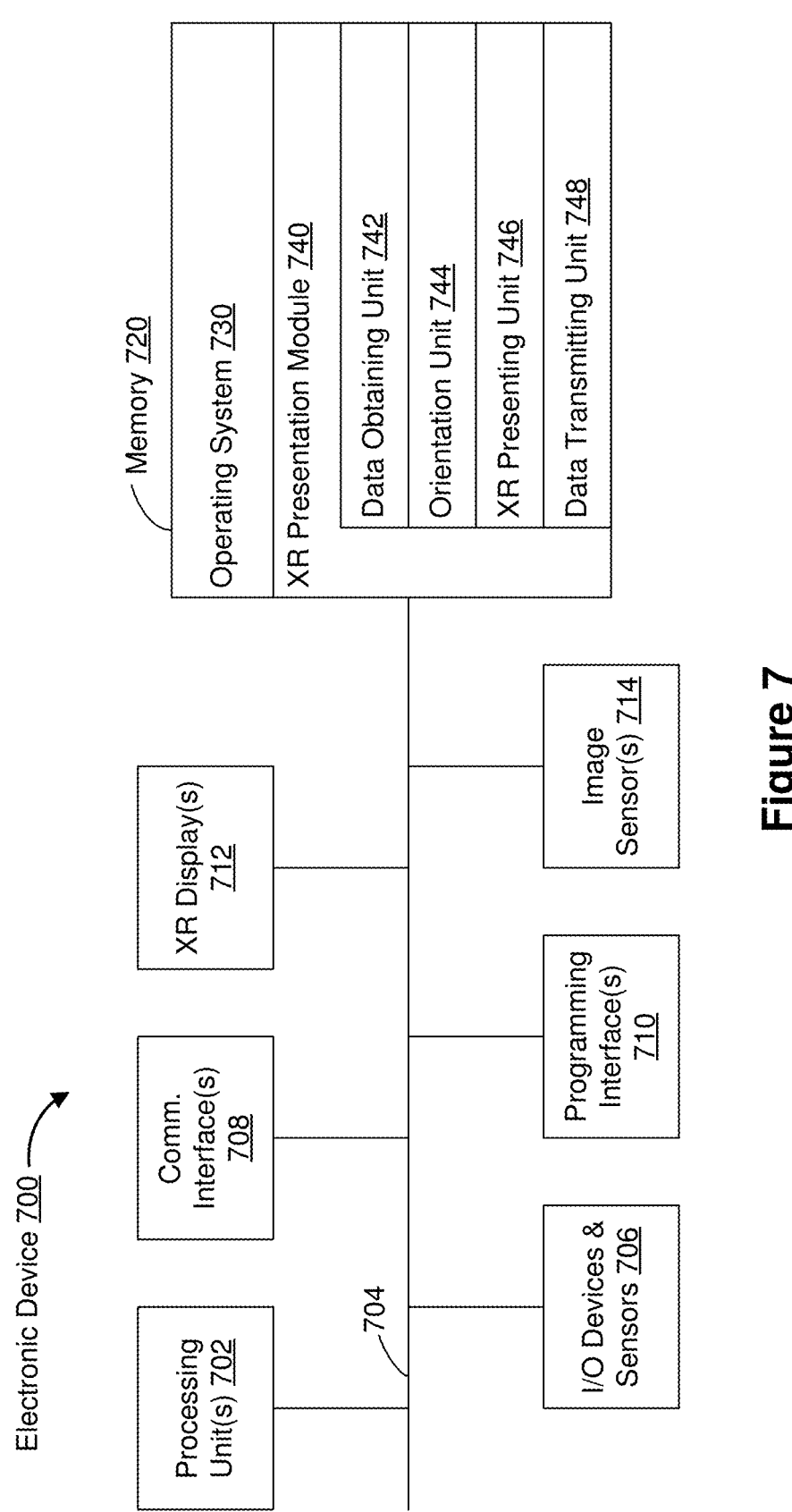
FIG. 7 is a block diagram of an example electronic device in accordance with some implementations.

Moreover, FIG. 7 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device including one or more processors, non-transitory memory, and an image sensor:

capturing, using the image sensor, a first image of a physical environment;

detecting a first plurality of lines within the first image of the physical environment;

determining one or more vanishing directions based on the first plurality of lines;

defining a downward direction based on the one or more vanishing directions;

capturing, using the image sensor, a second image of the physical environment;

detecting a second plurality of lines within the second image;

determining an updated one or more vanishing directions based on the second plurality of lines; and updating the downward direction based on the updated one or more vanishing directions.

2. The method of claim 1, wherein determining the one or more vanishing directions includes determining a first vanishing point and determining a first vanishing direction based on the first vanishing point.

3. The method of claim 2, wherein determining the first vanishing point is based on a random sample consensus (RANSAC) algorithm defining a first subset of the first plurality of lines.

4. The method of claim 3, wherein determining the one or more vanishing directions includes determining a second vanishing direction based on a second vanishing point determined based on a RANSAC algorithm excluding the first subset of the first plurality of lines.

5. The method of claim 4, wherein determining the one or more vanishing directions includes determining a second vanishing direction based on a voting algorithm.

6. The method of claim 4, wherein determining the one or more vanishing directions includes determining a third direction based on a cross-product of the first vanishing direction and the second vanishing direction.

7. The method of claim 1, wherein determining the one or more vanishing directions includes determining a first vanishing direction, a second vanishing direction, and a third direction based on a three-line RANSAC algorithm.

8. The method of claim 7, further comprising selecting the third direction as the downward direction.

9. The method of claim 7, further comprising selecting the first vanishing direction, the second vanishing direction, or the third direction as the downward direction based on a vector from an inertial measurement unit.

10. The method of claim 1, further comprising displaying virtual content based on the downward direction.

11. The method of claim 10, wherein displaying the virtual content based on the downward direction includes displaying a virtual object aligned with the downward direction.

12. The method of claim 10, wherein displaying the virtual content based on the downward direction includes displaying a virtual object moving along the downward direction.

13. The method of claim 1, further comprising updating display of virtual content based on the updated downward direction.

14. A device comprising:

an image sensor;

non-transitory memory; and one or more processors to:

capture, using the image sensor, a first image of a physical environment;

detect a first plurality of lines within the first image of the physical environment;

determine one or more vanishing directions based on the first plurality of lines;

define a downward direction based on the one or more vanishing directions;

capture, using the image sensor, a second image of the physical environment;

detect a second plurality of lines within the second image;

determine an updated one or more vanishing directions based on the second plurality of lines; and update the downward direction based on the updated one or more vanishing directions.

15. The device of claim 14, wherein the one or more processors are to determine the one or more vanishing directions by:

determining a first vanishing direction based on a first vanishing point;

determining a second vanishing direction based on a second vanishing point; and determining a third direction based on a cross-product of the first vanishing direction and the second vanishing direction.

16. The device of claim 14, wherein the one or more processors are further to display virtual content based on the downward direction.

17. The device of claim 16, wherein the one or more processors are to display the virtual content based on the downward direction by displaying a virtual object aligned with the downward direction.

18. The device of claim 16, wherein the one or more processors are to display the virtual content based on the downward direction by displaying a virtual object moving along the downward direction.

19. A non-transitory memory storing one or more programs, which, when executed by one or more processors of a device including an image sensor, cause the device to:

capture, using the image sensor, a first image of a physical environment;

detect a first plurality of lines within the first image of the physical environment;

determine one or more vanishing directions based on the first plurality of lines;

define a downward direction based on the one or more vanishing directions;

capture, using the image sensor, a second image of the physical environment;

detect a second plurality of lines within the second image;

determine an updated one or more vanishing directions based on the second plurality of lines; and update the downward direction based on the updated one or more vanishing directions.

* * * * *